Aug. 12, 1958

W. A. ANDERSON 2,847,044

ATTACHMENT FOR TABLE SAWS TO PRODUCE
CIRCULAR DISCS AND CYLINDERS
Filed March 29, 1957

Walter A. Anderson,
INVENTOR.

BY Ralph Donath
Attorney

United States Patent Office 2,847,044
Patented Aug. 12, 1958

2,847,044
ATTACHMENT FOR TABLE SAWS TO PRODUCE CIRCULAR DISCS AND CYLINDERS

Walter A. Anderson, Pittsburgh, Pa.

Application March 29, 1957, Serial No. 649,368

8 Claims. (Cl. 143—171)

This invention relates to cutting and turning machines and particularly to a mechanism for turning circular discs and cylinders.

It is frequently necessary to cut from wood a circular disc or cylinder. Heretofore no simple, inexpensive and efficient means has been available.

It is an object of the present invention to provide a cutting mechanism capable of forming from wood a circular disc or cylinder.

A further object of the invention is to provide a frame having a vertically movable saw blade thereon and a shaft movable parallel to the axis of the saw blade and adapted to carry the work piece in contact with the blade.

Another object of the invention is to provide a work-piece holder having a shaft adapted to move axially parallel to a saw shaft to traverse a work-piece in contact with a saw blade.

Other objects, advantages and purposes of this invention will be apparent from a consideration of the following description and the accompanying drawings in which.

Figure 1:
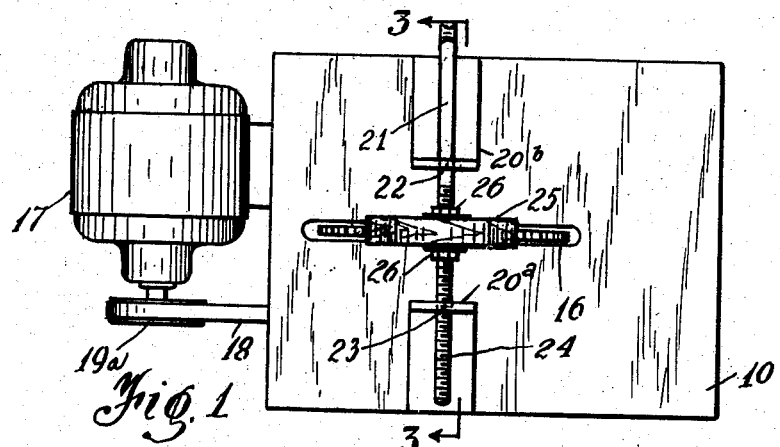
Figure 1 is a top plan view of a cutting and turning mechanism according to this invention.

Referring to the drawings there is illustrated a saw table 10 carrying an elevatable arbor 11 journaled in one end of a bell crank 12. The bell crank 12 is pivoted on a shaft 13 and the end opposite the arbor 11 acts as a handle 14. A locking knob 15 holds the arbor 11 in selected position. A saw blade 16 mounted on the arbor 11 is driven by a motor 17, belt 18, pulley 19 on arbor 11 and pulley 19a on the motor 17.

A pair of spaced vertical legs 20a and 20b are provided on the opposite sides of the blade 16 to carry a shaft 21 parallel to the arbor. Leg 20b is provided with corresponding spaced smooth holes 22. Leg 20a is provided with threaded openings 23 which engage threads 24 on shaft 21. The opposite leg 20b has smooth journaled holes receiving the crankshaft 21 for rotation. A centrally-bored block of wood 25 to be formed into a disc or cylinder is mounted on the shaft 21 by means of clamping nuts 26 screwed on the threads 24 of the shaft 21. The shaft 21 is turned by a crank arm 21a.

Figure 2:
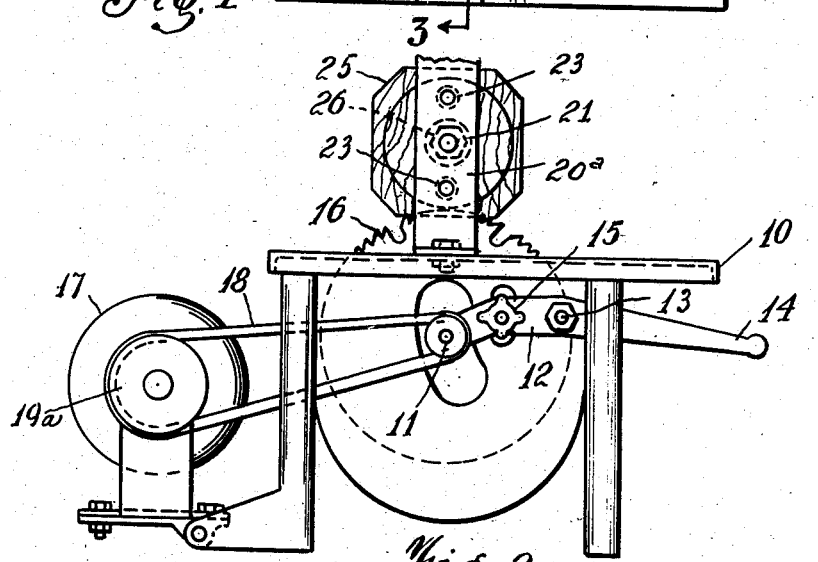
Figure 2 is a side elevation of the invention of Figure 1.
Figure 3:
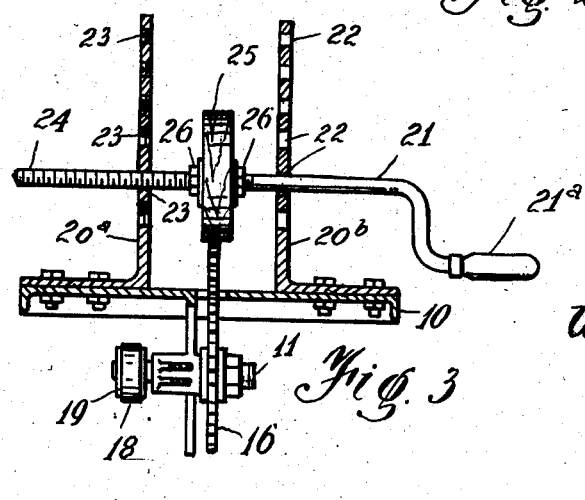
Figure 3 is a section on the line 3—3 of Figure 1.

The mechanism of the invention operates as follows:

The legs 20a and 20b are moutned on saw table 10 on opposite sides of blade 16 so that the shaft 21 will be parallel to the arbor 11. A block of wood 25, having a center aperture and preferably with the corners removed (see Figure 2) is placed on the shaft 21 intermediate its ends and nuts 26 are tightened to hold the block in place. The shaft 21 is then turned to screw the threads 24 into the threads 23 of the hole 22 in leg 20a. The arbor 11 is raised by handle 14 until the saw blade 16 is properly positioned with respect to the block 25 for cutting the desired circle or cylinder. The motor is then started and the wood block 25 is fed over the rotating saw blade 16 by turning the crank handle 21a to the right or left thus cutting away the wood to form the desired circular contour (see partial cut in drawings).

While a preferred embodiment of this invention has been illustrated and described herein it will be understood that the invention may be otherwise embodied within the scope of the following claims.

I claim:

1. A mechanism for cutting circular discs and the like comprising a table, a saw blade adjustably positioned to project partially above said table, means on the table receiving a shaft substantially parallel to the axis of the blade and adjustably spaced therefrom, feed means adapted to traverse the shaft parallel to the axis of the blade, means for rotating said shaft and work holding means on the shaft adapted to hold a work piece being formed.

2. A mechanism for cutting circular discs and the like comprising a table, a saw blade adjustably positioned to project partially above said table, support means on the table receiving a shaft substantially parallel to the axis of the blade and adjustably spaced therefrom, threaded feed means on the shaft engaging threads on the support means for traversing the shaft parallel to the axis of the blade, means for rotating said shaft and work holding means on the shaft adapted to hold the work piece being formed.

3. A mechanism for cutting circular discs and the like comprising in combination a circular saw having a table, a saw blade adjustably positioned to project above the table, support means extending vertically above the table on opposite sides of the blade, spaced in line openings in said support means receiving a shaft parallel to the axis of the blade, one of said openings threadingly engaging the shaft whereby to traverse the shaft parallel to the axis of the blade, means for rotating said shaft, and work holding means on the shaft adapted to hold the work piece being formed.

4. A mechanism for cutting circular discs and the like on a circular saw having a table and a saw blade adjustably positioned to project above the table comprising a pair of support members adapted to be fastened to the table on opposite sides of the saw blade, a shaft adjustably mounted for rotation in said support members parallel to the axis of the saw blade, feed means adapted to traverse the shaft parallel to the axis of the saw blade, means for rotating said shaft, and work holding means on the shaft between the support member adapted to hold a work piece being formed.

5. A mechanism for cutting circular discs and the like on a circular saw having a table and a saw blade adjustably positioned to project above the table comprising a pair of support members adapted to be fastened to the table on opposite sides of the saw blade, a shaft adjustably mounted for rotation in said members parallel to the axis of the saw blade, threaded feed means on the shaft engaging threads on one of said support members for traversing the shaft parallel to the axis of the blade, means for rotating said shaft and work holding means on the shaft adapted to hold the work piece being formed.

6. A mechanism as claimed in claim 5 wherein the threaded feed means is made up of a threaded portion on the shaft threadingly engaging a threaded opening in the support member.

7. A mechanism as claimed in claim 6 wherein the work holding means is a pair of collars threaded onto the threaded portion of the shaft.

8. A mechanism as claimed in claim 5 wherein the means for rotating the shaft is a crank arm.

References Cited in the file of this patent

UNITED STATES PATENTS

| | | |
|---|---|---|
| 2,696,230 | Libby | Dec. 7, 1954 |
| 2,715,924 | Norris | Aug. 23, 1955 |
| 2,720,897 | Kairath | Oct. 18, 1955 |
| 2,766,785 | Joyal | Oct. 16, 1956 |